April 17, 1951      M. U. SQUIERS      2,549,541

PRISM-LIKE LENS, PARTICULARLY FOR VIEWING TRAFFIC LIGHTS

Filed Nov. 30, 1948

Inventor.
Max Uri Squiers,

Patented Apr. 17, 1951

2,549,541

UNITED STATES PATENT OFFICE 2,549,541

PRISMLIKE LENS, PARTICULARLY FOR VIEWING TRAFFIC LIGHTS

Max Uri Squiers, La Grange, Ill., assignor to Charles Peckat Manufacturing Co., a corporation of Illinois Application November 30, 1948, Serial No. 62,748

4 Claims. (Cl. 88—1)

This invention relates to a viewing device having a prism-like lens, and more particularly to a viewing device particularly adapted for viewing traffic lights.

One feature of this invention is that it provides an improved viewing device particularly adapted for viewing traffic lights; another feature of this invention is that it provides a viewing device having a lens and a yoke with arms pivotally mounted on the lens at generally opposite points on the periphery thereof to provide for adjustment of the angle between the lens and the yoke; a further feature of this invention is that the arms of the yoke are pivotally mounted at their ends on the periphery of the lens adjacent the bottom portion thereof, said arms being adapted to receive the lens therebetween; an additional feature of the invention is that the lens is generally semi-circular and the arms of the yoke have a curvature closely corresponding to the semi-circular formation of the lens and are adapted to receive the lens therebetween; still another feature of the invention is that the lens and the yoke member have complementary portions providing adjustable stop means for determining the angle between the lens and the yoke member; and yet a further feature of the invention is that the yoke member carries a suction cup for mounting the device on a window.

Other features and advantages of this invention will be apparent from the following specification and from the drawings in which.

Referring now more particularly to the drawings, the viewing device designated generally at 10 is shown mounted on the inside surface of the windshield 11 of an automobile 12. Preferably the device is mounted slightly to the left and below eye level of the driver of the automobile.

Most modern automobiles are provided with a visor similar to that shown at 13, and this visor often blocks the driver's vision of traffic lights, especially overhead traffic lights such as that shown at 14. The operation of the viewing device is to refract light rays as indicated by the dashed line 15 to permit the driver to see the traffic light which would otherwise be out of his vision because of the visor or other overhanging front of the automobile when the automobile approaches the traffic light or when the automobile is stopped adjacent the traffic light.

Figure 1:
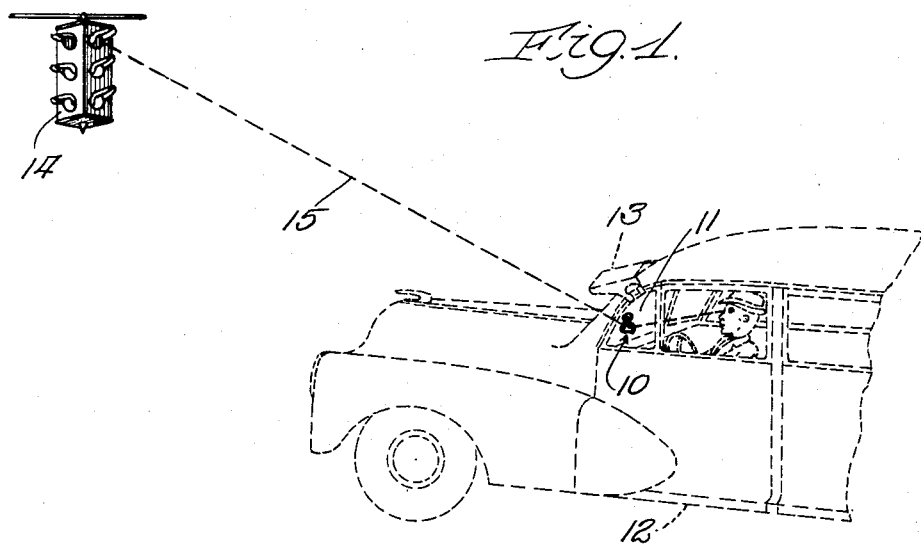
Fig. 1 illustrates the viewing device installed upon the windshield of an automobile and shows diagrammatically the operation of the device in refracting light rays.
Figure 2:
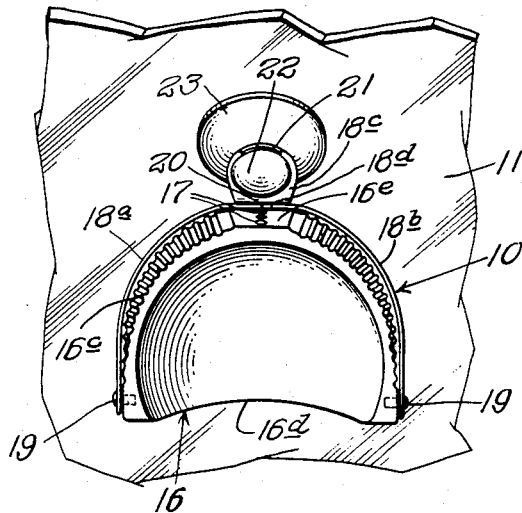
Fig. 2 is an enlarged front elevation of a portion of the windshield of the automobile of Fig. 1 showing the viewing device mounted thereon.
Figure 3:
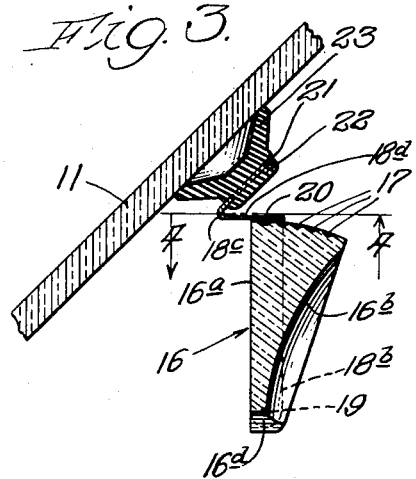
Fig. 3 is an enlarged vertical cross section through the viewing device and the portion of the windshield on which it is mounted.
Figure 4:
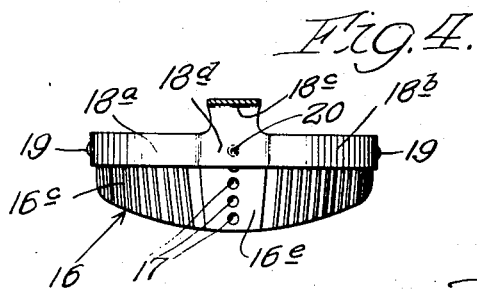
Fig. 4 is a horizontal section taken along the line 4—4 of Fig. 3.

As shown best in Figs. 2 and 3 the device includes a plano-sphero-concave lens designated generally at 16. This lens preferably is generally semi-circular in shape and has a plane back surface 16a adapted to be mounted closest adjacent the windshield 11, and a plano-sphero-concave surface 16b adapted to be the front surface (closest the driver) in operation. The generally semi-circular edge portion of the lens preferably is serrated as shown at 16c, and the bottom edge portion 16d of the lens may be generally plane or may be slightly concave as shown in Fig. 2 and beveled as shown in Fig. 3. The semi-circular edge portion has a flattened area 16e at the top of the lens, and this flattened area is provided with a plurality of indentations 17 arranged in a straight line transverse of the lens edge, these indentations providing a portion of an adjustable friction stop means.

A one piece yoke having arms 18a and 18b and a central mounting or bracket portion 18c is provided, the arms being pivotally mounted at their ends on the semi-circular edge portion of the lens at opposite points on the periphery thereof adjacent the bottom edge portion 16d by means of rivets 19. As seen best in Fig. 2 the arms 18a and 18b have a curvature closely corresponding to the semi-circular formation of the lens and are adapted to receive the semi-circular lens therebetween. The yoke is provided with a flattened area 18d adjacent the flattened area 16e on the lens, and a detent 20 in the flattened area of the yoke is adapted to cooperate with the indentations 17 on the lens, engagement of said detent with one of said indentations providing adjustable friction stop means for determining the angle between the lens and yoke.

The bracket portion 18c of the yoke has arms forming an open collar as shown in Fig. 2, which collar is adapted to engage a groove 21 in a button or mounting portion 22 of a suction cup 23 for mounting the device on the windshield 11 or other window if desired.

The construction of my improved viewing device provides considerable advantages over any device heretofore known in the art. The device is easy to manufacture and assemble and mount for operation. In manufacture, the lens may be made of Lucite or Plexiglas or other thermo-plastic material and may be molded in a single operation, including the formation of the holes for the rivets 19, the flattened area 16e, the indentation 17, and the serrations 16c. Similarly, the yoke member may be stamped in a single operation out of a piece of sheet metal or other flexible material, and the yoke may be mounted on the lens merely by securing the rivets 19 to the yoke and inserting the rivets in the holes provided in the lens, while the suction cup may be mounted on the yoke by merely pushing the open collar of the yoke into the groove 21.

In mounting the device for operation the suction cup is preferably moistened with glycerine or water and pressed against the inner surface of the windshield slightly to the left and below eye level of the driver. Inasmuch as the lens is pivoted on the yoke adjacent the bottom of the lens the angle between the yoke and lens may readily be changed to provide coverage of a desired viewing area regardless of the angle of the windshield in the automobile, and the friction stop means permits ready adjustment and at the same time serves to hold the parts in the desired position.

Inasmuch as the pivotal connection between the lens and the yoke is adjacent the bottom of the lens, and inasmuch as the stop means are formed from complementary portions of the yoke and the lens and the suction cup is mounted directly on the yoke, my improved viewing device provides a larger field of vision than any heretofore known without increasing the overall size of the device, particularly the length thereof.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A device for viewing a traffic light or the like positioned beyond the normal field of vision comprising: a prism having a concavo face, a generally semi-circular edge portion and a substantially linear apex extending between the ends of the edge portion; a yoke having arms pivotally mounted on said edge portion adjacent the apex of the prism to provide a pivotal axis for the prism substantially parallel to said apex, said arms having a curvature closely corresponding to said semi-circular edge portion and being adapted to receive said prism therebetween; a plurality of spaced engaging portions on the base of the prism, said engaging portions being spaced generally along a line lying in a plane substantially perpendicular to the pivotal axis of the prism; engaging means on the yoke closely adjacent the base and adapted to coact with any one of the engaging means on the prism to hold the prism in any one of a plurality of adjusted positions relative to the yoke; and means carried by the yoke for mounting the device.

2. A device for viewing a traffic light or the like positioned beyond the normal field of vision comprising: a prism having a concavo face, a generally semi-circular edge portion and a substantially linear apex extending between the ends of the edge portion; a yoke having arms pivotally mounted on said edge portion adjacent the apex of the prism to provide a pivotal axis for the prism substantially parallel to said apex, said arms having a curvature closely corresponding to said semi-circular edge portion and being adapted to receive said prism therebetween; holding means on the base of the prism; coacting holding means on the yoke, said holding means coacting generally along a line lying in a plane perpendicular to the pivotal axis of the prism to hold the prism in any one of a plurality of adjusted positions relative to the yoke; and means carried by the yoke for mounting the device.

3. A device for viewing a traffic light or the like positioned beyond the normal field of vision comprising: a prism having a concavo face, a generally semi-circular edge portion and a substantially linear apex extending between the ends of the edge portion and said prism having a flattened area on its base; a one-piece generally semi-circular yoke having arms pivotally mounted at their ends on said semi-circular portion at opposite points on the periphery of said prism adjacent the apex thereof, said arms having a curvature closely corresponding to said semi-circular portion and being adapted to receive said semi-circular portion therebetween, said yoke having a flattened area adjacent the flattened area of the base and each of said flattened areas having complementary portions adapted to engage each other to provide an adjustable friction stop adapted to adjustably hold the prism at the required angle with respect to the yoke; and a suction cup carried by said yoke for mounting said device on the windshield of a vehicle.

4. A device for viewing a traffic light or the like positioned beyond the normal field of vision comprising: a prism having a concavo face; a yoke having a pair of arms; means for pivotally mounting the prism on the arms of the yoke with the prism lying generally within the yoke; holding means on the yoke; coacting holding means on the prism remote from the pivotal axis thereof for holding the prism in any one of a plurality of adjusted positions with respect to the yoke, with one of said holding means extending generally along a line lying in a plane substantially perpendicular to the pivotal axis of the prism; and means carried by the yoke for mounting the device.

MAX URI SQUIERS.

REFERENCES CITED

The following references are of record in the file of this patent:

UNITED STATES PATENTS

| Number | Name | Date |
| --- | --- | --- |
| 190,133 | Doten | May 1, 1877 |
| 771,067 | Heeren | Sept. 27, 1904 |
| 852,864 | Wright et al. | May 7, 1907 |
| 1,628,218 | Beauchamp | May 10, 1927 |
| 1,731,284 | Andel et al. | Oct. 15, 1929 |
| 1,883,296 | Johnson | Oct. 18, 1932 |
| 1,902,322 | Davis | Mar. 21, 1933 |
| 2,307,532 | Murphy | Jan. 5, 1943 |